United States Patent
Luddy et al.

(10) Patent No.: US 10,103,799 B2
(45) Date of Patent: Oct. 16, 2018

(54) APPARATUS AND METHOD FOR INCREASED DATA RATES IN UNDERWATER COMMUNICATIONS USING ORBITAL ANGULAR MOMENTUM

(71) Applicant: LOCKHEED MARTIN CORPORATION, Bethesda, MD (US)

(72) Inventors: Michael J. Luddy, Priceton, NJ (US); Jack H. Winters, Middletown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 2 days.

(21) Appl. No.: 15/070,752

(22) Filed: Mar. 15, 2016

(65) Prior Publication Data
US 2017/0187442 A1 Jun. 29, 2017

Related U.S. Application Data

(60) Provisional application No. 62/133,645, filed on Mar. 16, 2015.

(51) Int. Cl.
H04B 10/08 (2006.01)
H04B 17/00 (2015.01)
(Continued)

(52) U.S. Cl.
CPC ....... *H04B 7/0632* (2013.01); *H04B 10/0773* (2013.01); *H04B 10/0775* (2013.01);
(Continued)

(58) Field of Classification Search
CPC ...... H04B 7/0632; H04B 13/02; H04J 14/007
See application file for complete search history.

(56) References Cited

U.S. PATENT DOCUMENTS 5,724,363 A * 3/1998 Breya ................ H04L 1/22
714/708
7,058,367 B1 * 6/2006 Luo .................. H04B 7/0669
375/267
(Continued)

FOREIGN PATENT DOCUMENTS

EP 1909413 A1 * 4/2008 ......... H04B 10/5167
EP 1909413 12/2010
(Continued)

OTHER PUBLICATIONS

Jian Wang, "Terabit free-space data transmission employing orbital angular momentum multiplexing", Jun. 24, 2012, Nature Photonics, All pages.*
(Continued)

*Primary Examiner* — David Payne
*Assistant Examiner* — Pranesh Barua
(74) *Attorney, Agent, or Firm* — Hamre, Schumann, Mueller & Larson, P.C.

(57) ABSTRACT

A system for providing underwater communication using orbital angular momentum (OAM) includes a transmitter that processes input data to be transmitted using pre-coding information based on current transmission channel conditions to maximize data rate based on channel conditions. A receiver receives a transmitted multiplexed OAM optical signal and analyzes the received signal for channel state information. The channel state information is used to determine a set of pre-coding values that allow the transmitter to pre-code the input data to maximize the data rate based on current channel conditions. The pre-coding values are mapped to a codebook entry which identifies the pre-coding values. The codebook entry is transmitted from the receiver to the transmitter. The transmitter uses the received codebook entry to identify pre-coding values used to process
(Continued)

subsequent input data to be transmitted in order to enhance data rate across the transmit channel.

17 Claims, 13 Drawing Sheets

(51) Int. Cl.

| | | |
|---|---|---|
| H04B 7/06 | (2006.01) | |
| H04J 11/00 | (2006.01) | |
| H04J 14/00 | (2006.01) | |
| H04B 13/02 | (2006.01) | |
| H04L 5/00 | (2006.01) | |
| H04L 25/03 | (2006.01) | |
| H04L 27/20 | (2006.01) | |
| H04L 27/26 | (2006.01) | |
| H04B 10/077 | (2013.01) | |
| H04B 10/079 | (2013.01) | |
| H04B 10/548 | (2013.01) | |

(52) U.S. Cl.
CPC ......... *H04B 10/0795* (2013.01); *H04B 13/02* (2013.01); *H04J 11/00* (2013.01); *H04J 14/00* (2013.01); *H04J 14/007* (2013.01); *H04L 5/0046* (2013.01); *H04L 25/03898* (2013.01); *H04L 27/2096* (2013.01); *H04L 27/2697* (2013.01); *H04B 10/548* (2013.01)

(56) References Cited

U.S. PATENT DOCUMENTS

| | | | | |
|---|---|---|---|---|
| 7,444,161 B2 * | 10/2008 | Cao | ............... | H04B 7/0669 375/267 |
| 9,077,577 B1 * | 7/2015 | Ashrafi | ............... | H04L 27/362 |
| 9,197,249 B2 * | 11/2015 | Djordjevic | ......... | H03M 13/1148 |
| 9,674,711 B2 * | 6/2017 | Bennett | ............... | H04W 16/26 |
| 2005/0163207 A1 * | 7/2005 | Buckwalter | ....... | H04L 25/03878 375/229 |
| 2006/0072677 A1 * | 4/2006 | Kwak | ............... | H04B 7/0417 375/260 |
| 2007/0133992 A1 * | 6/2007 | Yamamoto | ......... | H04J 14/0209 398/83 |
| 2008/0273874 A1 * | 11/2008 | Ramachandran | ............... | H04B 10/25751 398/43 |
| 2009/0196602 A1 * | 8/2009 | Saunders | ........... | H04B 10/5053 398/26 |
| 2010/0317959 A1 | 12/2010 | Elgort et al. | | |
| 2011/0002371 A1 * | 1/2011 | Forenza | ............... | H04B 7/0417 375/227 |
| 2011/0194594 A1 * | 8/2011 | Noh | ............... | H04B 7/024 375/224 |
| 2011/0207451 A1 * | 8/2011 | Brauer | ............... | H04L 5/0007 455/422.1 |
| 2012/0063771 A1 * | 3/2012 | Sugaya | ............. | H04B 10/2935 398/26 |
| 2012/0201282 A1 * | 8/2012 | Li | ............... | H04B 7/0417 375/219 |
| 2012/0213111 A1 * | 8/2012 | Shimezawa | ............ | H04B 7/063 370/252 |
| 2012/0263466 A1 * | 10/2012 | Djordjevic | ......... | H04L 27/2096 398/65 |
| 2013/0027034 A1 | 1/2013 | Elgort et al. | | |
| 2013/0148963 A1 * | 6/2013 | Cvijetic | ............... | H04J 14/04 398/45 |
| 2013/0235744 A1 * | 9/2013 | Chen | ............... | H04L 47/82 370/252 |
| 2013/0272698 A1 * | 10/2013 | Jin | ............... | H04L 27/2628 398/43 |
| 2013/0315267 A1 * | 11/2013 | Sasaki | ............... | H04B 10/5563 370/536 |
| 2014/0248058 A1 * | 9/2014 | Simpson | ............... | H04B 13/02 398/104 |
| 2014/0334831 A1 * | 11/2014 | Kawazoe | ............ | H04B 10/693 398/210 |
| 2014/0363166 A1 * | 12/2014 | Lacovara | ............... | H04B 13/02 398/104 |
| 2015/0132004 A1 * | 5/2015 | Farr | ............... | H04B 13/02 398/104 |
| 2015/0288476 A1 * | 10/2015 | Ashrafi | ............... | H04L 27/362 398/79 |
| 2015/0333865 A1 * | 11/2015 | Yu | ............... | H04B 10/5161 398/44 |
| 2016/0028479 A1 * | 1/2016 | Ren | ............... | H04B 10/1121 398/43 |
| 2016/0043794 A1 * | 2/2016 | Ashrafi | ............... | H04B 7/0697 370/329 |
| 2016/0111781 A1 * | 4/2016 | Matteoni | ............. | G02B 27/286 343/911 R |
| 2016/0202090 A1 * | 7/2016 | Cvijetic | ............... | G01S 17/66 356/614 |
| 2016/0204896 A1 * | 7/2016 | Yu | ............... | H04J 14/086 398/65 |
| 2016/0212510 A1 * | 7/2016 | Bogoni | ............... | H04J 14/04 |
| 2016/0233959 A1 * | 8/2016 | Murshid | ............ | H04B 10/2581 |
| 2016/0277173 A1 * | 9/2016 | Dutronc | ............ | H04W 72/0446 |
| 2017/0026095 A1 * | 1/2017 | Ashrafi | ............... | H04B 7/0456 |

FOREIGN PATENT DOCUMENTS

| | | | |
|---|---|---|---|
| WO | 2015024595 | 2/2015 | |
| WO | WO 2015024595 A1 * | 2/2015 | ............... H04J 14/04 |

OTHER PUBLICATIONS

Jianyang Shi, "Time division multiplexed orbital angular momentum access system", Mar. 8, 2016, SPIE, All Pages.*
Yongxiong Ren, "Adaptive-optics-based simultaneous pre- and post-turbulence compensation of multiple orbital-angular-momentum beams in a bidirectional free-space optical link", Oct. 15, 2014, Optica, All Pages.*
Shuhui Li, "Power-Controllable Multicasting of a Single Gaussian Mode to Multiple Orbital Angular Momentum (OAM) Modes", 2014, OSA, All pages.*
International Search Report and Written Opinion for international application No. PCT/US2016/022473, dated Oct. 24, 2016 (13 pages).
J. Baghdady et al., "Spatial multiplexing for blue lasers for undersea communications," Proc. SPIE vol. 9459, Ocean Sensing and Monitoring VII, 2015 (7 pages).
I. Chant, "'Twisted' Radio Beams Data at 32 Gigabits per Second," found online at http://spectrum.ieee.org/tech-talk/telecom/wireless/sending-data-on-twisted-radio-waves, updated on Oct. 16, 2014 (3 pages).
M. Krenn et al., "Communication with spatially modulated light through turbulent air across Vienna," New Journal of Physics, vol. 16, 2014 (10 pages).

* cited by examiner

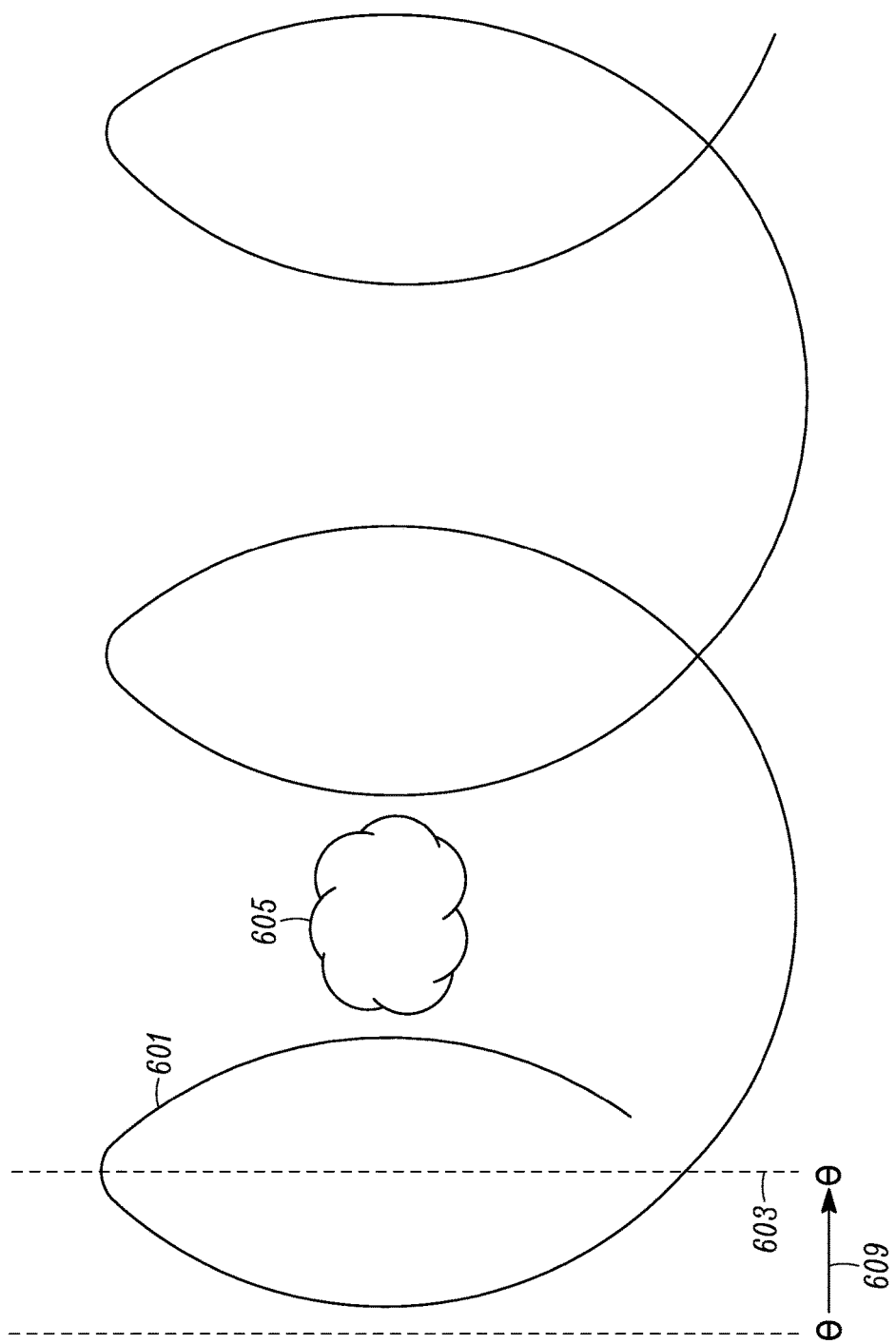

APPARATUS AND METHOD FOR INCREASED DATA RATES IN UNDERWATER COMMUNICATIONS USING ORBITAL ANGULAR MOMENTUM

FIELD

This application relates to optical communications. More particularly, this application relates to optical communications in underwater environments.

BACKGROUND

Undersea communication options and their accompanying constraints are significantly different than options and constraints encountered above the surface. In particular, radio frequency (RF) communications are severely limited undersea as electro-magnetic waves are rapidly absorbed in a conductive medium like seawater. A widely used option for undersea communications is acoustics. Acoustics may be considered similar to RF communications, but at acoustic frequencies. Acoustic pressure waves propagate very well in water with reasonably low loss. However, because acoustic frequencies are much lower than RF frequencies, the corresponding data rate is also much lower. Another disadvantage is that acoustic communication does not exhibit low probability of intercept (LPI), as the acoustic signals can spread out and travel long distances. Thus, undersea RF or acoustics fall far short in meeting undersea operational requirements for connectivity due to physics, the lack of LPI, insufficient bandwidth and/or the ability to be jammed or otherwise denied.

Undersea free-space optical communication, typically laser communication, has been considered to overcome some of these limitations. Propagation in sea water is best for blue light in deep water and green light in shallower water, with ranges typically on the order of a few hundred meters in deep clear dark water, and much less near the surface where turbidity of the water can greatly limit the range. Attenuation occurs due to losses from absorption and scattering, which is enhanced by the effects of turbidity. Scattering also increases the divergence of a transmitted laser beam. Scattering decreases the received signal level and makes a wider field-of-view necessary at the receiver. Also, scattering causes multipath due to the path delay differences. Multipath limits the data rate of single carrier systems as the pulses temporally disperse and data symbols interfere with each other, creating inter-symbol interference (ISI). Modern lasers can provide Gigabit per second (Gbps) data rates at a range of about 100-200 meters (m). This data rate is ideal for uploading or downloading massive amounts of data quickly over short distances. At longer ranges, much lower data rates are achievable (e.g., only 100's of bits-per-second (bps) data rates) at 1 km using a 1 meter diameter receiver and 1 Watt transmitter. Today's systems typically require higher data rates. Laser communications are also highly directional. This requires techniques for accurate pointing along with acquisition of the pointing angle. This directionality also provides for some LPI, as does the range limitation. Optical systems are also less prone to jamming and eavesdropping.

A need exists to dramatically increase the data rate and range of undersea laser communications, increasing undersea connectivity and robustness against turbidity, while mitigating multipath ISI and providing for better LPI and protection against eavesdropping.

SUMMARY

An underwater communication system using orbital angular momentum (OAM) includes a transmitter that processes input data to be transmitted using pre-coding values based on current transmission channel conditions. Pre-coding may include defining modulation and coding schemes (MCS) for each of a plurality of orthogonal frequency division multiplexing (OFDM) sub-carriers. For example, sub-carrier spacing and bit loading for each data stream may be selected during pre-coding. In addition, power supplied to each of a number of lasers used to modulate the data streams onto an optical signal corresponding to an orthogonal OAM mode may be varied to maximize data rate through the channel. The system includes a receiver that receives the multiplexed OAM optical signal and analyzes the received signal for channel state information. The channel state information is used at the receiver to determine a codebook entry in a previously-derived table, with the codebook entry corresponding to a set of precoding values at the transmitter and used for processing at the receiver that maximizes the data rate based on current channel conditions. This codebook entry is transmitted from the receiver to the transmitter, which then uses the received codebook entry to identify the precoding values used to process subsequent input data to be transmitted in order to enhance data rate across the transmit channel in combination with the corresponding processing at the receiver.

BRIEF DESCRIPTION OF THE DRAWINGS

A better understanding of the following written description may be achieved with reference to the following drawings in which:

FIG. 6A and FIG. 6B illustrate the adjustment of phase in an OAM optical communication signal to mitigate the effects of turbidity in a water transmission medium.

DETAILED DESCRIPTION

Figure 1:
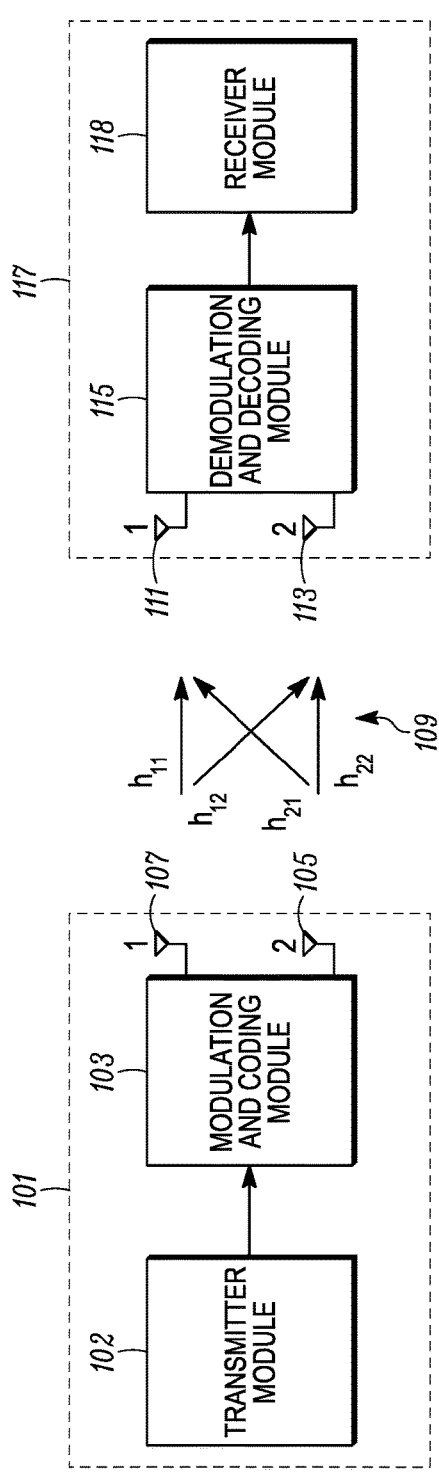
FIG. 1 is a block diagram illustrating a multiple-input-multiple-output (MIMO) communications system.
Figure 2:
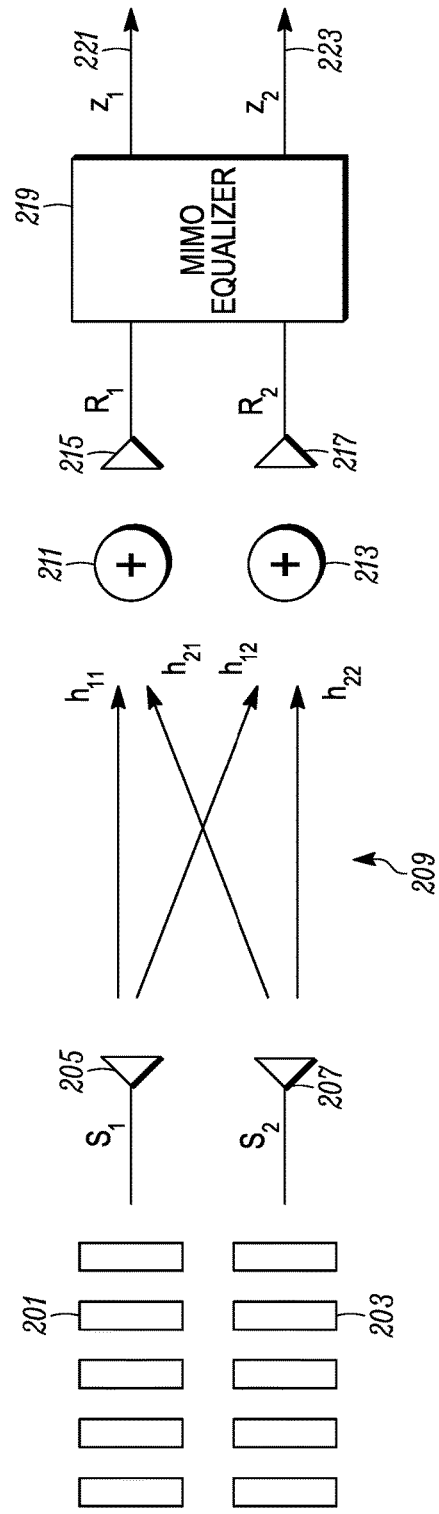
FIG. 2 is a block diagram illustrating a MIMO communication system which breaks input data into separate data streams.

The use of spatial multiplexing provides an M-fold increase in data rate without requiring an increase in transmit power. The increase in data rate is achieved by an increase in number of transmit (Tx) and receive (Rx) antennas (for RF). In the case of optical communications, multiple optical lenses or various lens techniques may be used to achieve similar results. This is parallel to RF multiple-input-multiple-output (MIMO) presently used in communications. FIG. 1 and FIG. 2 illustrate the use of spatial multiplexing in an RF system, but similar techniques can be used in optical systems.

FIG. 1 shows a transmitter 101 with a transmitter module 102 that generates signals that are processed in a modulation and coding module 103. Information is inserted into the output RF signal through modulation. The data or information in the modulated waveform is coded according to known techniques before transmission to provide various functions, for example, encryption or error correction techniques may be applied, as well as pre-coding between the two transmitted signals. The transmitter 101 includes more than one antenna 105, 107 which transmit the modulated coded output signals. The output signals are transmitted through the communication medium (e.g., air for wireless RF communications) to corresponding antennas 111, 113 at a receiver 117 that includes a demodulation and decoding module 115 and a receiver module 118. The wireless signals are transmitted and propagate through the transmission medium via a communication channel 109.

In FIG. 2, the transmitter (not shown) generates data which is then split into two data streams 201, 203 and the data is encoded and modulated as two transmitted signals. The signals are transmitted by two transmit elements 205, 207 and are received by two receive elements 215, 217, along with added noise. The channel 209 between the transmit elements 205, 207 and receive elements 215, 217 is given by Equation 1:

$$H = \begin{bmatrix} h_{11} & h_{12} \\ h_{21} & h_{22} \end{bmatrix} \quad \text{Equation (1)}$$

where $h_{ij}$ is the complex channel gain between the ith transmit elements 205,207 and jth receive elements 215, 217. At the receiver the two received signals are demodulated at MIMO equalizer 219 and separated into the two transmitted data streams 221, 223 using for example, digital signal processing and/or optical signal processing. For example, minimum mean square error combining may be performed to separate the transmitted data streams. As shown in FIG. 2, an independent data stream 201, 203 is mapped to each transmit element 205, 207, respectively. The data streams 201, 203 experience spatial crosstalk in the MIMO channel (as indicated by crossed lines $h_{12}$ and $h_{21}$), which has to be mitigated at the receiver in the MIMO equalizer 219. The number of independent data streams 201, 203 must be less than or equal to the number of transmit elements 205, 207. Linear MIMO equalizers 219 require that the number of independent data streams be less than the lesser of the number of transmit antennas and the number of receive antennas. However, non-linear MIMO equalizers do not have this constraint. The level of spatial crosstalk is related to the off-diagonal elements of the channel transfer function matrix. If the channel matrix is diagonal there is no crosstalk in the channel.

Multipath phenomena, as experienced in undersea optical systems, results in a channel matrix with non-zero off-diagonal terms. In such systems, pre-coding can be used to mitigate spatial crosstalk in the MIMO channel. Specifically, the channel matrix can be decomposed using singular value decomposition (SVD), whereby:

$$H = U\Sigma V^H \quad \text{Equation (2)}$$

where H is the MIMO channel transfer function given in Equation (1), V is a singular matrix which represents the optimum pre-coding matrix in additive white Gaussian noise (AWGN), U is a singular matrix representing the optimum receiver matrix, $\Sigma$ is a diagonal matrix having diagonal elements corresponding to the strength of the orthogonal spatial channels, and the superscript H denotes the complex conjugate transpose.

Figure 3:
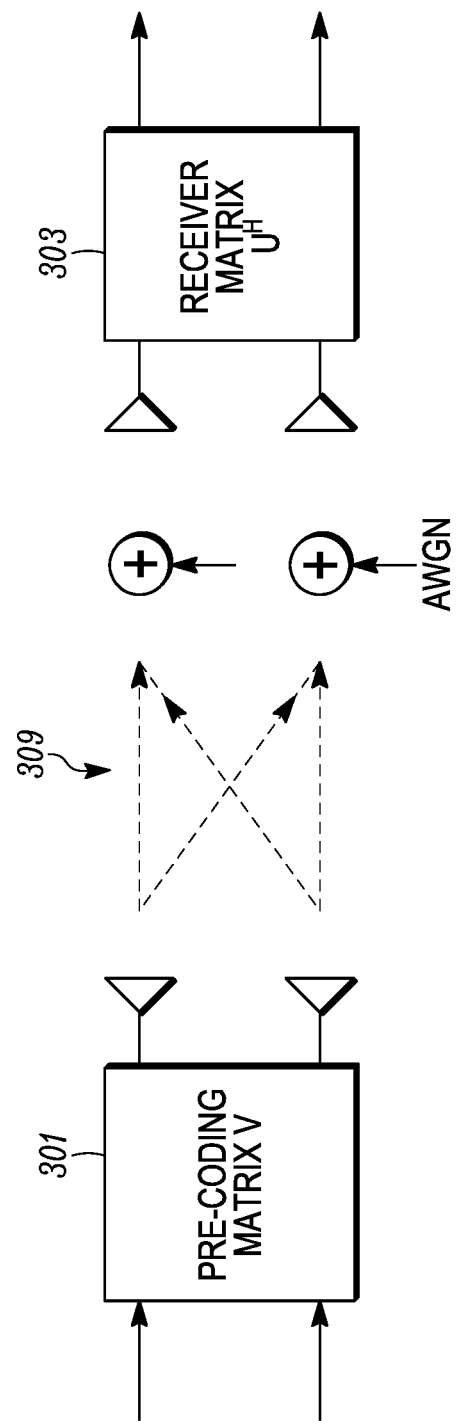
FIG. 3 is a block diagram of a MIMO communication system illustrating the use of singular value decomposition (SVD) through pre-coding and receiver processing of a signal with a given channel matrix.

FIG. 3 shows the SVD with pre-coding performed at the transmitter and linear combining at the receiver. Pre-coding at the transmitter 301 and linear equalization at the receiver 303 results in an effective channel 309 that is free of spatial crosstalk.

Figure 4:
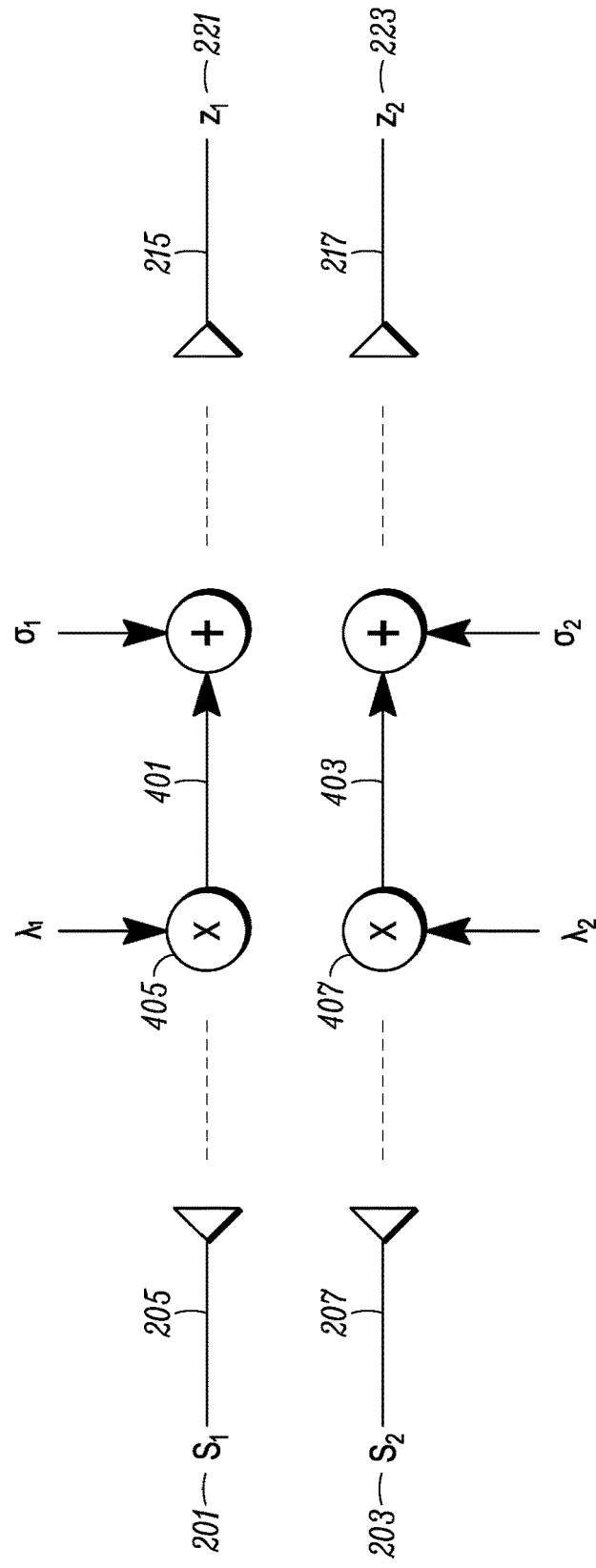
FIG. 4 is a block diagram illustrating virtual parallel channels created by the SVD process of FIG. 3.

Thus, using SVD the MIMO channel transforms into a set of independent parallel "virtual" channels 401, 403 as shown in FIG. 4. These are eigenvector channels, with the corresponding eigenvalues defined by the diagonal elements of $\Sigma$, i.e., $\lambda_1$ and $\lambda_2$, and added noise $\sigma_1$ and $\sigma_2$, for the first and second virtual channels, respectively.

In undersea systems, the eigenvalues are generally not equal, and turbidity can cause the virtual channels to vary even more in their range of eigenvalues. As a result, maximum system capacity cannot be achieved by having the same transmit power in each of the transmitted signals with a total transmit power constraint. Rather, capacity is maximized using a water-filling algorithm, whereby the total power is allocated between the virtual channels to maximize capacity. Water-filling can be implemented by generating full power signals which are then attenuated as needed before amplification and transmission. In an optical system, the power in the transmitter is in large part due to the power supplied to the lasers. To reduce the total power, multiple lasers are used to generate the OAM mode signals. One laser is provided per OAM mode signal. Therefore, the power of the each laser can be adjusted according to water-filling, rather than attenuating the signals differently during modulation of the optical signal, to minimize the total power used in the transmitter and/or to meet a total transmit power constraint. Alternatively, if one laser's output signal is split into multiple signals, where each signal is used to generate an OAM mode, the output signal power can be split unequally for each mode according to the calculated power allocation.

Figure 5:
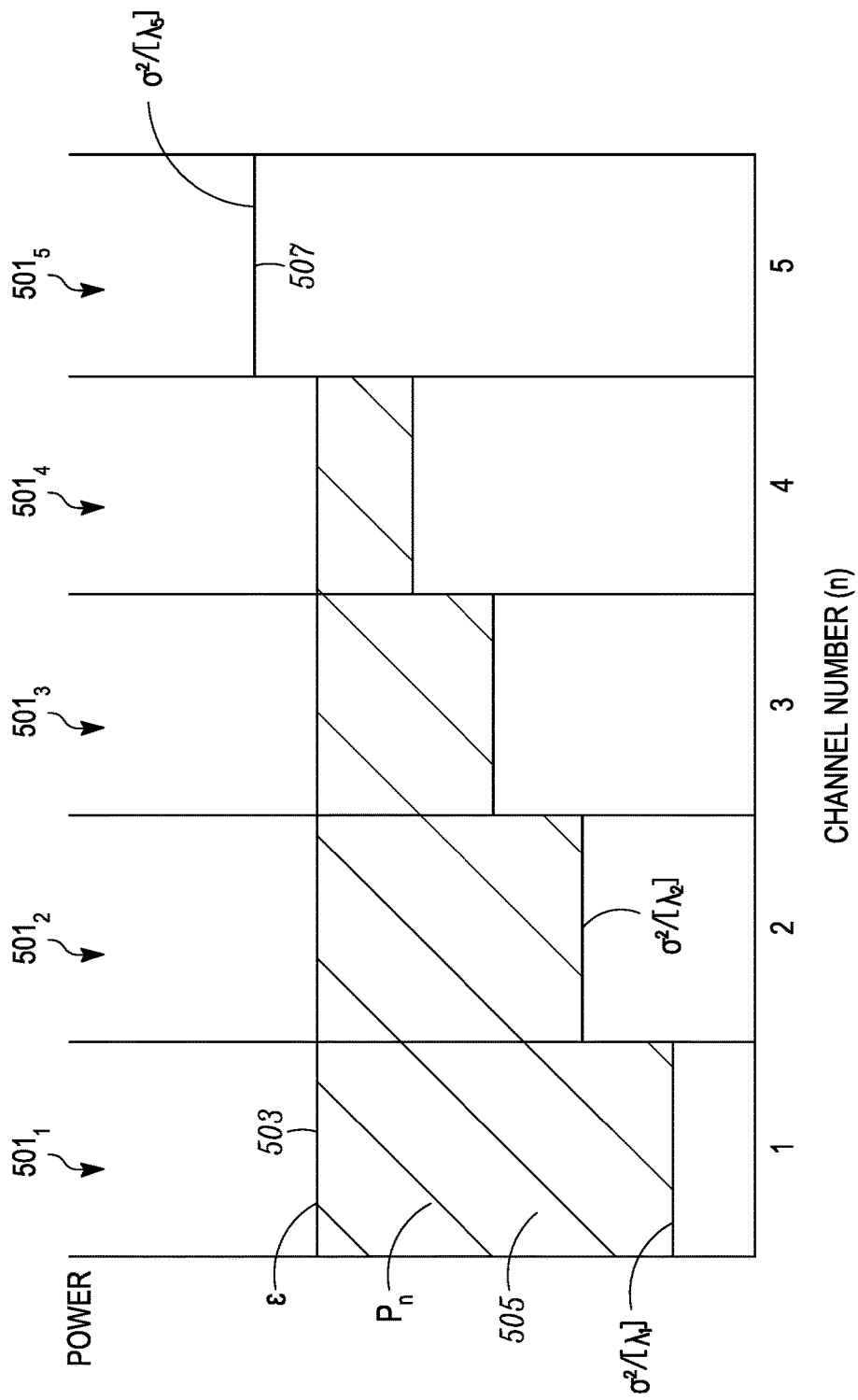
FIG. 5 is a graphical depiction of a water-filling algorithm for allocating power to transmission channels based on a total transmit power requirement.

FIG. 5 is a graphical depiction of allocation of power to virtual channels using a water-filling algorithm. Specifically, the water-filling algorithm may be described as follows. Given that there are N virtual channels $501_{1-5}$ (N=5 in FIG. 5), with eigenvalues $\lambda_i$, i=1, . . . , N, receiver noise per channel of $\sigma^2$, and total transmit power constraint P, the transmit powers $P_n$, n=1, ..., N for each of the virtual channels $501_{1-5}$ that maximizes the total capacity of the system is provided by:

$$P_n = \max\left(0, \varepsilon - \frac{\sigma^2}{|\lambda_n|}\right), \quad \text{Equation (3)}$$

$$\text{with } P = \sum_{n=1}^{N} P_n$$

The value for ε may be determined iteratively. The amount of power 505 allocated to each virtual channel $501_{1-5}$ is equivalent to that for filling a vessel up to a given level 503. If there is not enough total power P, some channels $501_{1-5}$ may not have power allocated to them, (i.e., these channels are not used). For example, as shown in FIG. 5 there are 5 channels but only 4 ($501_{1-4}$) are allocated power based on the total transmit power constraint. Channel $501_5$ is at a level 507 higher than the level 503 of channels $501_{1-4}$. Therefore, Channel $501_5$ does not receive any allocated power, which would correspond to turning off the laser associated with this channel.

Additionally, bit loading can be used to approach maximum capacity with the power allocation of water-filling. Different power allocated to different modes results in varying signal-to-noise ratios (SNRs) for the modes at the receiver. Assuming a maximum bit error rate (BER) requirement, adaptive coding and modulation can be used to maximize the total data rate. That is, a modulation, e.g., binary phase shift keying, quadrature phase shift keying, or quadrature amplitude modulation (QAM), and coding scheme (MCS) is chosen for each mode based on the highest available data rate (among available MCSs) that meets the BER requirement for the given signal-to-noise ratio (SNR) in each mode. This is referred to as bit loading because the number of data bits per symbol can vary among the modes. In one embodiment, this highest available data rate MCS is 16-QAM without coding. For an SNR in a received signal that is greater than the SNR required for the highest available data rate, the allocated power in that signal may be reduced to a level required to provide the highest available data rate. The saved power may then be allocated to other signals. This allocation of power to the signals is performed using joint waterfilling and bit loading with a maximum SNR constraint. In addition, there may be a maximum output power per laser constraint, such that the algorithm would maximize the capacity (total data rate) using joint water-filling and bit loading with a maximum SNR and maximum power per laser constraint. Allocation of less than maximum power is implemented by reducing each laser's output power accordingly.

Within the context of optical communications, orbital angular momentum (OAM) is linked to the spatial distribution of a transmitted beam. Helically phased beams are characterized by an azimuthal phase term $\exp(il\theta)$. The helically phased beams have an OAM of $1\hbar$ per photon (where l is topological charge, θ is azimuthal angle, and $\hbar$ is Planck's constant h divided by $2\pi$).

OAM is a property of various types of helically phased beams, ranging from electron beams to radio waves. As such, OAM may be used for spatial multiplexing, with a different spatial distribution for each transmitted mode. The number of OAM modes is theoretically unlimited. Therefore, OAM has the potential to dramatically increase the capacity of an undersea communication link. However, as l increases, the spatial distribution of the OAM mode becomes wider. As a result, a larger receive aperture is needed to receive the wider spatial distribution, which limits the capacity gains of OAM in practice. One method for generating OAM signals is to use an initial RF signal to modulate a laser with an information-carrying waveform. The modulated laser beam having a planar wavefront, e.g., a Gaussian beam, is passed through a spiral mask to convert the planar phase wavefront into a helical wavefront. This conversion is repeated for each OAM mode signal, with each OAM mode signal passed through a spiral mask with different l. The resulting signals are multiplexed together to transmit a single laser beam containing different OAM modes, (i.e., with different spatial distributions). Dual polarization may also be used, with each OAM mode signal having a corresponding OAM mode signal with the orthogonal polarization, which doubles the number of spatial data streams.

At the receiver, after separating the dual polarized signals, an inverse spiral mask is used for each OAM mode to recover the corresponding OAM signal. The OAM signal is then demodulated and the data in the signal is detected. This method has been used in free-space optics where limited crosstalk occurs between the modes at the receiver. For example, OAM in a turbulent (atmospheric) channel that resulted in significant crosstalk between the modes has been demonstrated. However, the turbulence-based crosstalk was easily removed using digital signal processing at the receiver. In an undersea channel, on the other hand, substantially more turbulence is experienced than in an atmospheric channel (e.g., the level of crosstalk due to turbulence and turbidity in water is orders of magnitude greater than that of air). Adding to the unique challenges in communicating in an underwater medium, turbidity resulting from foreign particulates suspended in the water column is experienced as well. The additional challenges unique to underwater communications requires additional pre-coding at the transmitter, including both bit loading and power adaptation among the modes/polarizations of the optical signals, to mitigate this crosstalk.

Realizing that there is a trade-off between capacity or data throughput and increased range, different modes can be configured to carry the same data coherently transmitted and the modes coherently combined at the receiver to achieve longer distance communications at the expense of a reduced data rate at a factor M versus OAM with spatial multiplexing.

In undersea optical communications, turbidity can cause rapid extinction of photons. By controlling the angular extent of OAM propagation (using spatial multiplexing) this effect may be mitigated. Randomized turbidity is overcome because the OAM modes propagate in different spiral patterns. Furthermore, the phase offset of each transmitted OAM signal may be adjusted to mitigate turbidity. For example, the phase delay may be adapted so that the helical beam avoids (e.g., spirals differently around) regions with high attenuation with turbidity as illustrated in FIGS. 6A and 6B.

Figure 6A:
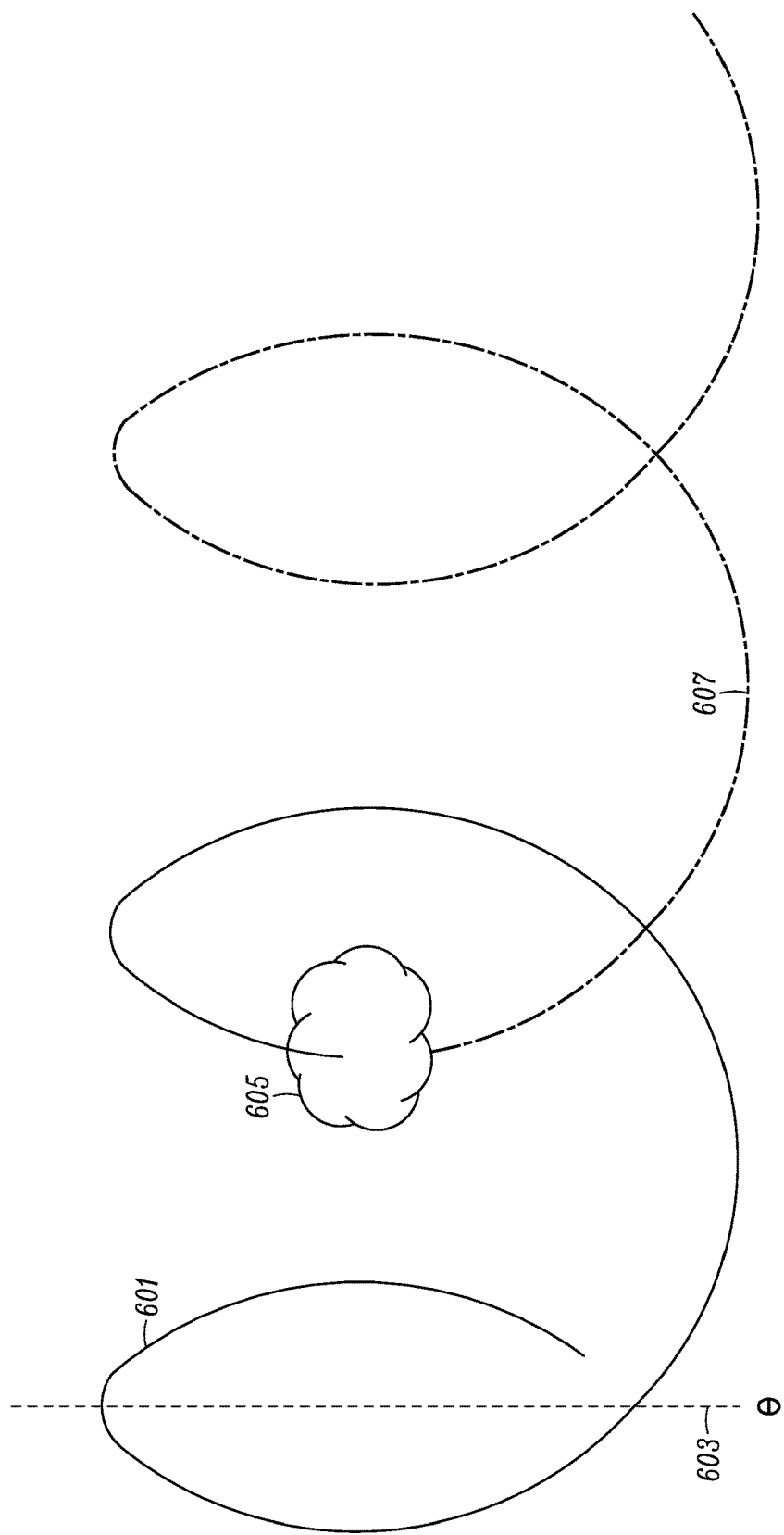

Referring to FIGS. 6A and 6B, a spiral optical signal propagating through a turbid underwater medium is illustrated. Spiral optical signal 601 is generated at phase θ 603. The phase at which the spiral optical signal 601 in FIG. 6A is generated causes the spiral optical signal 601 to intersect with a cloud or region of turbidity 605 with a phase dependent on phase θ 603. The optical signal is attenuated through reflection or scattering to produce a weakened blocked optical signal 607. In FIG. 6B, the phase 603 of spiral optical signal 601 is adapted to be advanced by an interval 609. The change in phase 603 of the spiral optical signal 601 causes the optical signal 601 to interact differently with the turbidity region 605 such that the crosstalk may be different and spiral optical signal 601 is propagated less impeded by the region of turbidity 605.

Spatial processing at the receiver can use spatial diversity along with OAM to select optimal modes, (i.e., those that are least affected by turbidity). Furthermore, with channel state information (CSI) (which includes the gains of the modes) at the transmitter, the transmitter can adjust the power in each mode to optimize the received signal power and/or data rate at the receiver. CSI may be provided by the receiver to the transmitter via a feedback loop, providing CSI measured by the receiver for subsequent mode power adjustment at the transmitter. Accordingly, this method exploits the use of jointly optimized transmit/receive processing. An effective technique is the use of water-filling among the OAM modes, which maximizes the data rate according to channel quality, allowing adaptation of the spatial optical pattern to mitigate turbidity.

Orthogonal frequency division multiplexing (OFDM) may be incorporated into pre-coding processing to further combat fading frequency selective fading, (i.e., "dispersion"). As discussed hereinabove, the undersea communications channel is subject to multipath. Multipath results in frequency selective fading, where frequency dependent amplitude and nonlinear phase variations of a transmitted lightwave signal affect the received signal, causing ISI. The application of OFDM can be used to combat frequency selective fading by taking the entire communications channel (in an embodiment, the optical channel carrier signal may be in the hundreds of terahertz region) and breaking it into multiple overlapping, but orthogonal, frequency subcarriers. Each subcarrier bandwidth is narrow enough such that the fading is nearly flat rather than frequency selective across the subcarrier bandwidth. This eliminates the need for a complex equalizer at the receiver for ISI, where now a Fast Fourier Transform (FFT) is used to mitigate frequency selective fading.

Figure 7:
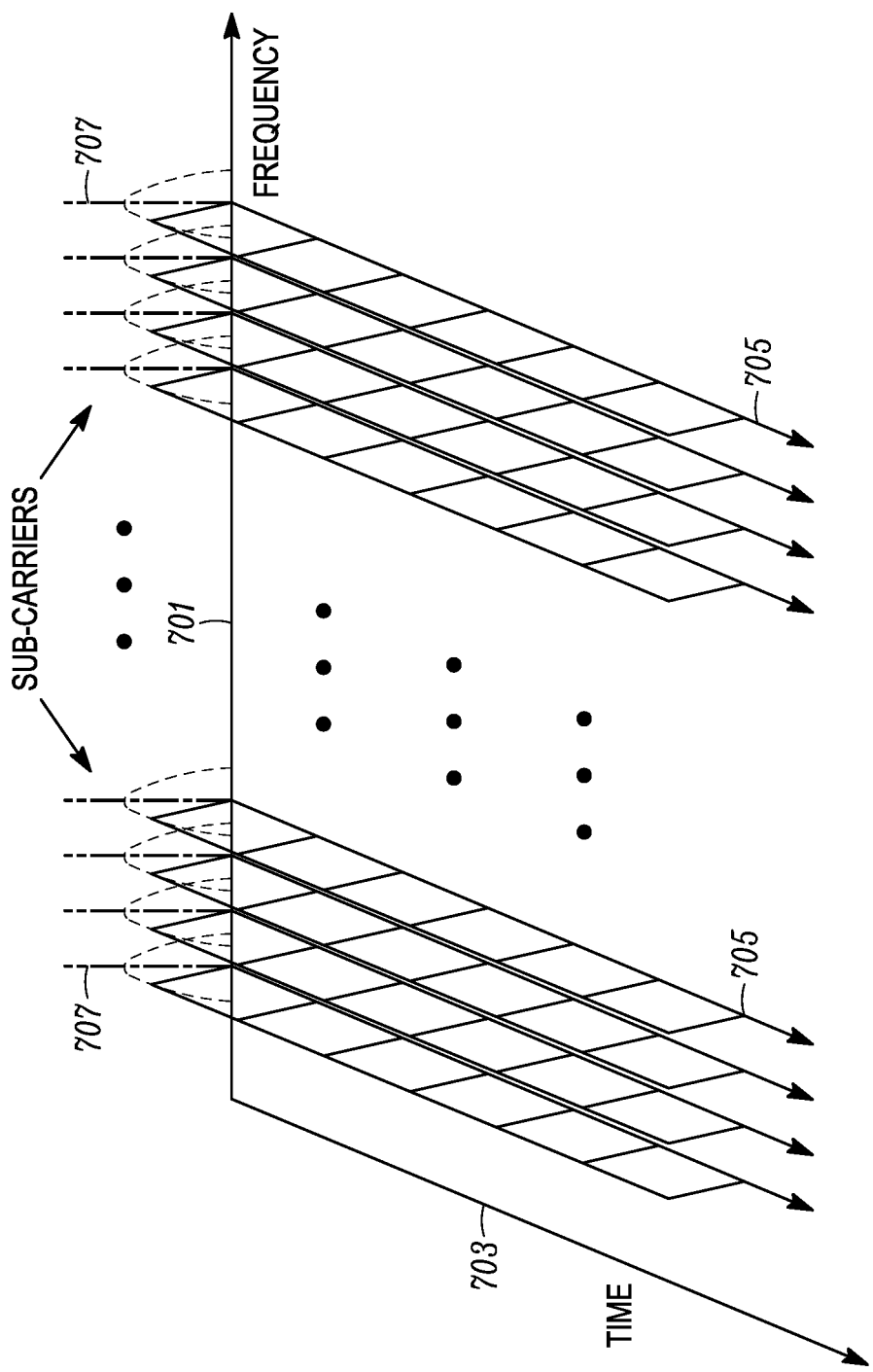
FIG. 7 is a graphical depiction of sub-carriers and their associated spacing in an orthogonal frequency division multiplexing (OFDM) process.

FIG. 7 illustrates the concept of OFDM, which divides the available bandwidth 701 (i.e., the frequency domain) into subcarriers 705, with each subcarrier 707 having a bandwidth narrow enough to avoid frequency selective fading. The subcarriers 705 transmit symbols over time, i.e., along the time axis 703, in different timeslots. This allows a single multiplexed signal to carry signals on multiple subcarriers 705 without interference between subcarriers 705.

Figure 8:
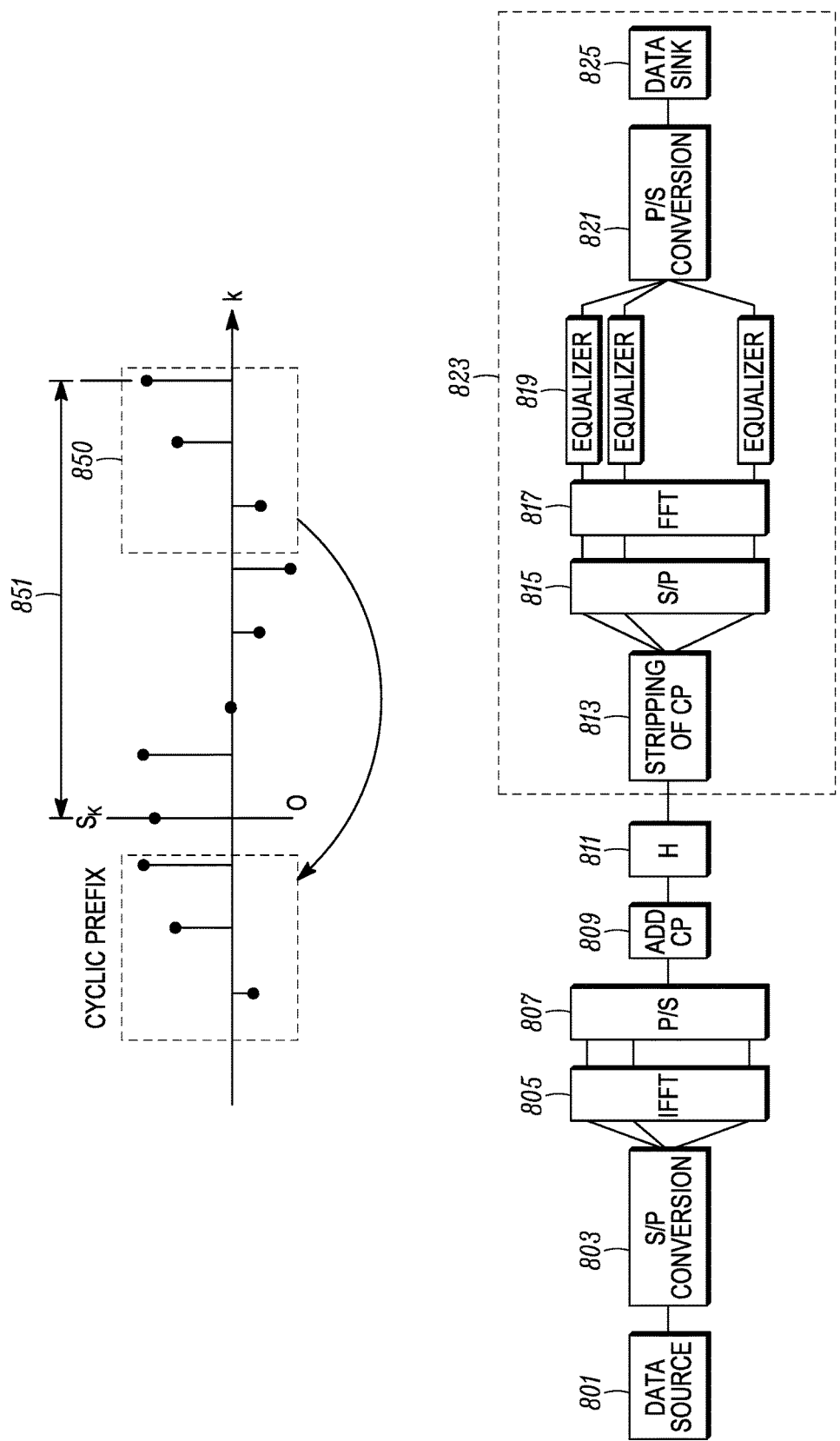
FIG. 8 is a block diagram illustrating the use of OFDM in a MIMO communications system.

FIG. 8 is a block diagram illustrating orthogonal frequency division multiplexing. The data stream 801 is first split into multiple streams in serial/parallel converter 803 and then an inverse fast Fourier transform (IFFT) 805 is performed. The parallel output streams are then combined into one stream 807 and a cyclic prefix is added 809 to the stream 801 to remove the effects of the channel delay spread. That is, the cyclic prefix is a guard interval that repeats the last part 850 of the current symbol 851 at the beginning of the current symbol to remove the effects of ISI due to multipath. The stream is then transmitted over the channel 811. The process may be performed for each OAM mode, with the data streams pre-coded to produce output signal streams 801 that modulate the OAM signals. The OAM signals are then multiplexed and the optical signal transmitted through the water. At the receiver 823, the OAM signals are demultiplexed into multiple signals and demodulated to generate baseband signals. These baseband signals are then linearly combined by the receive matrix to produce output signals. For each of these output signals, the receive process shown in FIG. 8 is used, with the cyclic prefix removed 813, the signal split into parallel streams 815 and then a Fast Fourier Transform (FFT) 817 performed. The parallel output of the FFT 817 may have their gains adjusted (e.g., equalized) 819 based on the channel characteristics, and the parallel streams multiplexed together 821 to form an output signal that is detected to generate an output data stream 825. In an embodiment, each output stream corresponds to one of the original transmit data streams.

Figure 9:
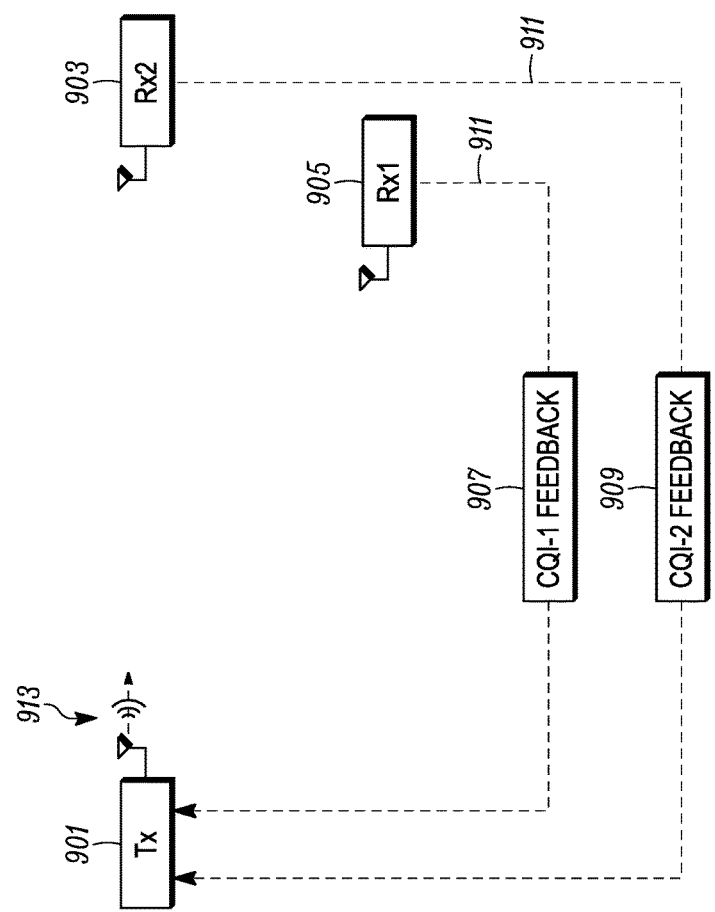
FIG. 9 is a block diagram of a MIMO communication system using a channel quality information (CQI) feedback loop.

FIG. 9 is a block diagram illustrating the use of a feedback loop from the receiver to the transmitter for providing CSI for use in pre-coding at the transmitter. In the undersea channel, as discussed above, the orthogonal transmitted spatial modes of OAM typically are not orthogonal at the receiver. Intensive signal processing may be required to separate the modes at the receiver 903, 905. A feedback loop 911 is used to establish a link from the receiver 903, 905 to the transmitter 901. As crosstalk experienced in the transmission channel changes slowly over time as compared to the propagation time, feedback reflecting this change in CSI may be fed back over feedback channel 911 to provide CSI at the transmitter 901 that can be used effectively to improve performance in an adaptive manner. The transmitter 901 may pre-code (pre-distort) the transmitted signals 913 (i.e., add crosstalk, such that the crosstalk is minimized at the receiver, and adjust the transmit power of each mode) according to the received feedback 907, 909. This greatly simplifies the receiver processing. Furthermore, water-filling can be performed to allocate the power among the transmitted eigenmodes to maximize capacity. Water-filling may be done across OAM modes (spatial), polarizations, and OFDM subcarriers (frequency) in each mode. Water-filling can be combined with bit loading, as described above for the OAM modes and further extended to include OFDM subcarriers. This combination of techniques provides required power allocation and bit loading in view of maximum SNR and maximum power per OFDM subcarrier constraints. Furthermore, since power may only be saved by reducing the power per OAM mode, (i.e., laser), power allocation and bit loading may also take into account the power provided per OAM mode to maximize total data rate for a given total overall transmit power, or alternatively, to minimize the total transmit power for a given total data rate.

FIG. 9 shows one feedback scheme, where CSI information, which may be quantized into channel quality information (CQI) 907, 909 is fed back from each of the receive modes 903, 905 (receiver modes 1 and 2). At each OAM mode receiver, the complex channel gain is determined from pilot tones that are sent from each of the OAM modes at the transmitter. The CQI is used at the transmitter 901 to determine the power allocation among the modes and OFDM subcarriers, as well as the pre-coding matrix. Alternatively, the receivers can determine the transmit power allocation and pre-coding matrix from the pilot tones, and send a codebook entry that tells the transmitter this information. In this embodiment, the codebook contains entries (e.g., code words), each code word corresponding to a set of power allocation and MCS values for each OFDM subcarrier on each OAM mode, as well as power allocation values among the OAM modes, and pre-coding matrix values. The values identified by code words are quantized to limit the total number of codebook entries. The sets of corresponding values are chosen to maximize performance with a given number of codebook entries. The selection is initially based on the expected range of channel conditions and may be periodically adjusted as long-term channel conditions change (the updated codebook, and its corresponding sets of values, are sent to the transmitter). The CSI, as determined by the receiver, is mapped to the corresponding closest set of codebook values, and the codebook entry (e.g., code word) corresponding to that set of values is transmitted to the transmitter.

Figure 10:
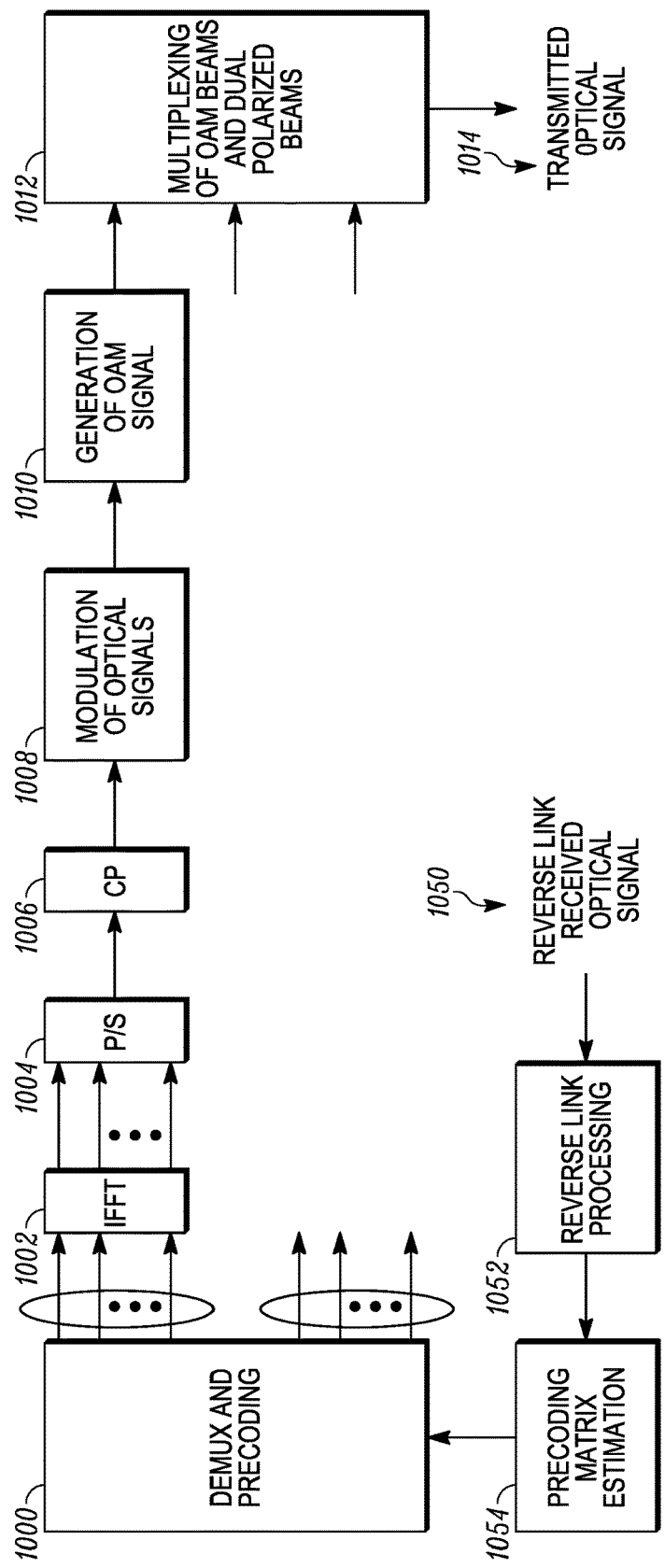
FIG. 10 is a block diagram of a transmitter for increasing data rate in underwater communications using orbital angular momentum OAM according to an embodiment of the disclosure.

FIG. 10 is a block diagram illustrating a transmitter in accordance with an embodiment of the disclosure. The input data (which includes pilot tone information) is first demultiplexed 1000 (split) among the different signal channels. These signal channels include $N_1$ OFDM subcarriers per OAM signal, and $N_2$ OAM signals (corresponding to $N_2$ different values of t) per polarization ($2*N_2$ OAM signals in total), for a total of $2*N_1*N_2$ signal channels. The data is mapped to an MCS for each signal channel based on the bit loading information from the receiver (i.e., pre-coding as indicated in block 1000). Pre-coding 1000 includes techniques such as allocating power among the signal channels based on information provided by the receiver (as accomplished by water-filling). The information from the receiver is derived from a reverse link optical signal 1050 that is processed as discussed below 1052 to produce a pre-coding matrix estimate 1054. For each signal that is modulated on a corresponding OAM signal, an IFFT 1002 is performed and the parallel output is converted to a serial data stream in parallel to serial converter 1004. A cyclic prefix (CP) is added 1006 to the serial signal. These signals are then used to produce modulated optical signals 1008 which are converted to OAM signals 1010 using spatial light modulators. The spatial light modulators create helical (spatially distributed) beams. The optical beams are combined together in multiplexer 1012 for the different modes and polarizations to create on optical signal 1014. The optical signal is then transmitted.

Figure 11:
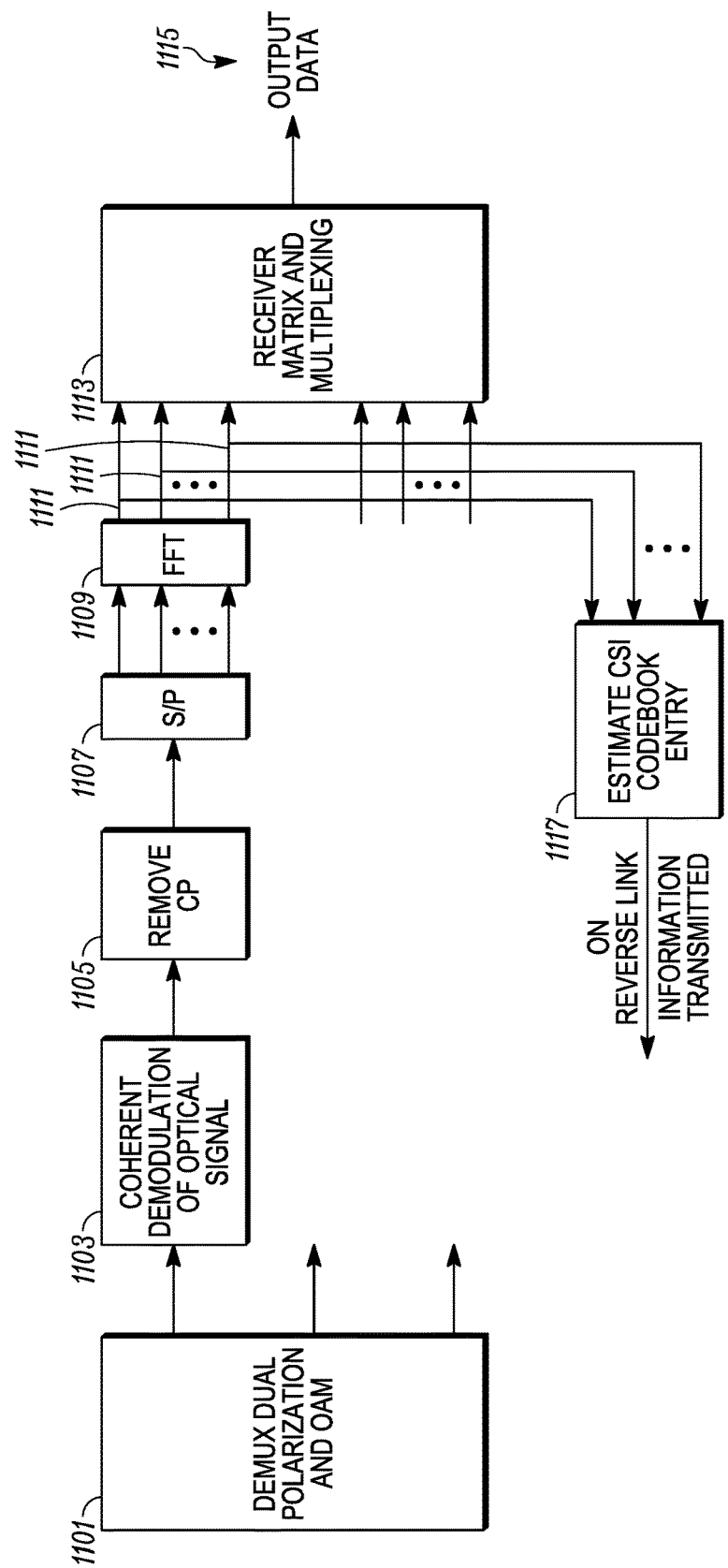
FIG. 11 is a block diagram of a receiver for increasing data rate in underwater communications using orbital angular momentum OAM according to an embodiment of the disclosure.

FIG. 11 is a block diagram illustrating a receiver according to an embodiment of the disclosure. The received optical signal is demultiplexed by first separating the signal based on polarization 1101. The OAM modes are separated using a spatial light modulator. The optical signals are then coherently demodulated 1103 to generate the corresponding baseband signals. The cyclic prefix is removed 1105 from each baseband signal, and each baseband signal is converted from a serial to parallel stream 1107 that is input to an FFT 1109. The outputs 1111 from all the FFTs are then multiplied by the receiver matrix 1113, and the data is detected and multiplexed into the output data stream 1115. The output data 1111 also contains the pilot tone information used for CSI estimation. The CSI is used to choose a codebook entry in signal processing block 1117. Based on the codebook entry, the processing to be performed in the transmitter (FIG. 10) and receiver (FIG. 11) for the next set of data from the transmitter is determined. The codebook information is sent from the receiver to the transmitter using a feedback loop, such as the feedback loop 911 shown in FIG. 9.

Figure 12:
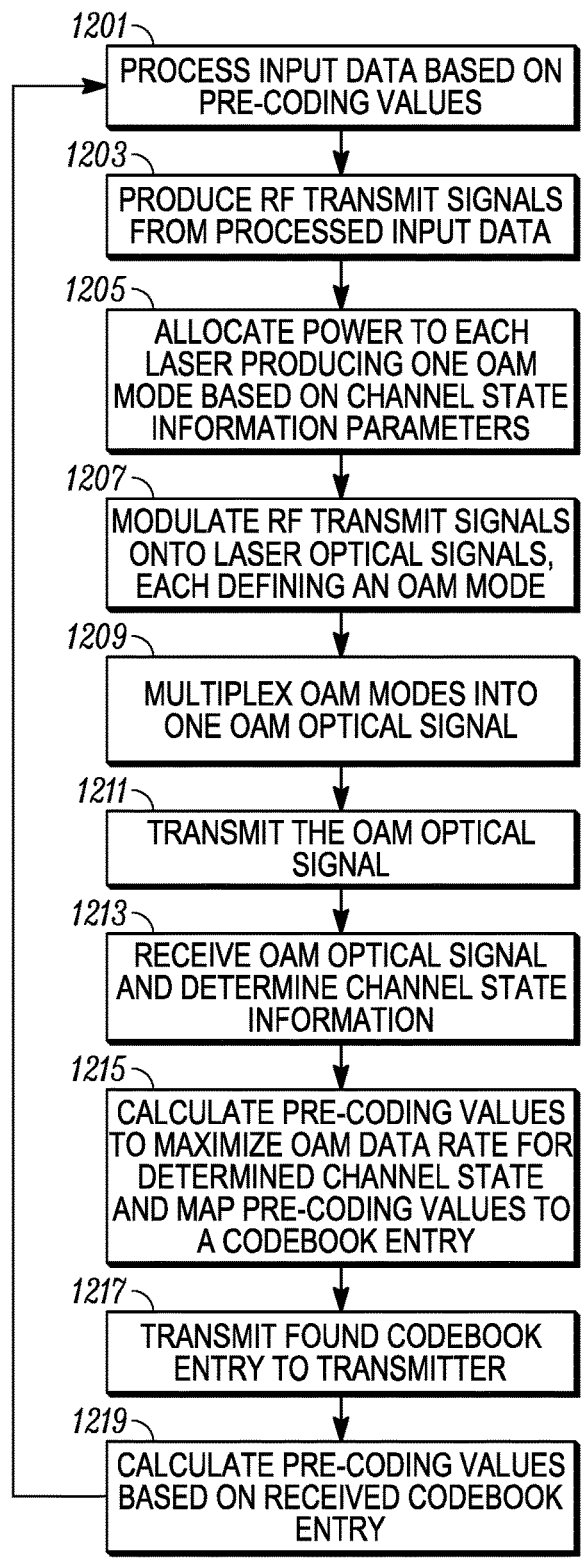
FIG. 12 is a process flow diagram for performing OAM underwater communications at high data rates according to an embodiment of the disclosure.

FIG. 12 is a flowchart showing the operation of an underwater optical communications system according to an embodiment of the disclosure. Input data is processed based on CSI parameters 1201. For example, pre-coding parameters based on previously determined CSI may include: power allocation of OAM modes or channels, bit loading, and OFDM subcarrier spacing. The input data is pre-coded and divided across OFDM frequencies and output as separate OFDM sub-carriers producing RF transmit signals from the processed input data 1203. Power is allocated to each of a number of lasers, wherein each laser produces one OAM mode 1205. The power allocation may be determined by an algorithm such as a water-filling algorithm. The RF transmit signals are modulated onto an optical signal by a corresponding laser, which defines an orthogonal OAM mode 1207. The intensity of the optical signal is determined in part by the power allocated to the laser that produced the OAM mode. The RF signals are modulated onto a Gaussian optical signal which is reflected off a spatial light modulator corresponding to the OAM mode to which the optical signal will be assigned. A spiral OAM mode signal is generated for the OAM mode. Pilot tones may be added to each OAM mode, for example, in different subcarriers and/or timeslots of the each OAM mode. When received, the pilot tones are analyzed for phase and amplitude to detect (1) the complex channel matrix (H) containing elements for each OFDM subcarrier in each OAM mode, (2) the coherence bandwidth based on the correlation of H with respect to subcarrier frequencies, and (3) the coherence time based on correlation of H with respect to time. Coherence bandwidth allows for proper determination of OFDM subcarrier spacing. Coherence time allows for proper determination of pilot tone spacing within timeslots. Based on the channel matrix H and the OFDM subcarrier spacing, water-filling is performed to allocate power and bit loading is utilized to calculate the optimum power allocation and MCS for each OFDM subcarrier in each OAM mode. The OAM mode signals are multiplexed to produce a single multiplexed OAM optical signal 1209. The multiplexed OAM optical signal is transmitted across an underwater medium to the receiver 1211.

The multiplexed OAM optical signal is received at the receiver. Based on the quality of the received signal, the receiver determines the current CSI 1213. Using the CSI determined by the receiver, pre-coding values are determined which maximize the total data rate. The pre-coding values which maximize the total data rate are mapped to an entry, i.e., codeword, in a codebook which most closely represents the calculated pre-coding values 1215. The codeword corresponding to the codebook entry that most closely matches the calculated pre-coding values is transmitted to the transmitter 1217. The transmitter uses the codeword to determine pre-coding values represented by the received codebook entry for processing the next portion of input data to be transmitted 1219. The pre-coding values are used by the transmitter to process the next portion of input data 1201.

Figure 13:
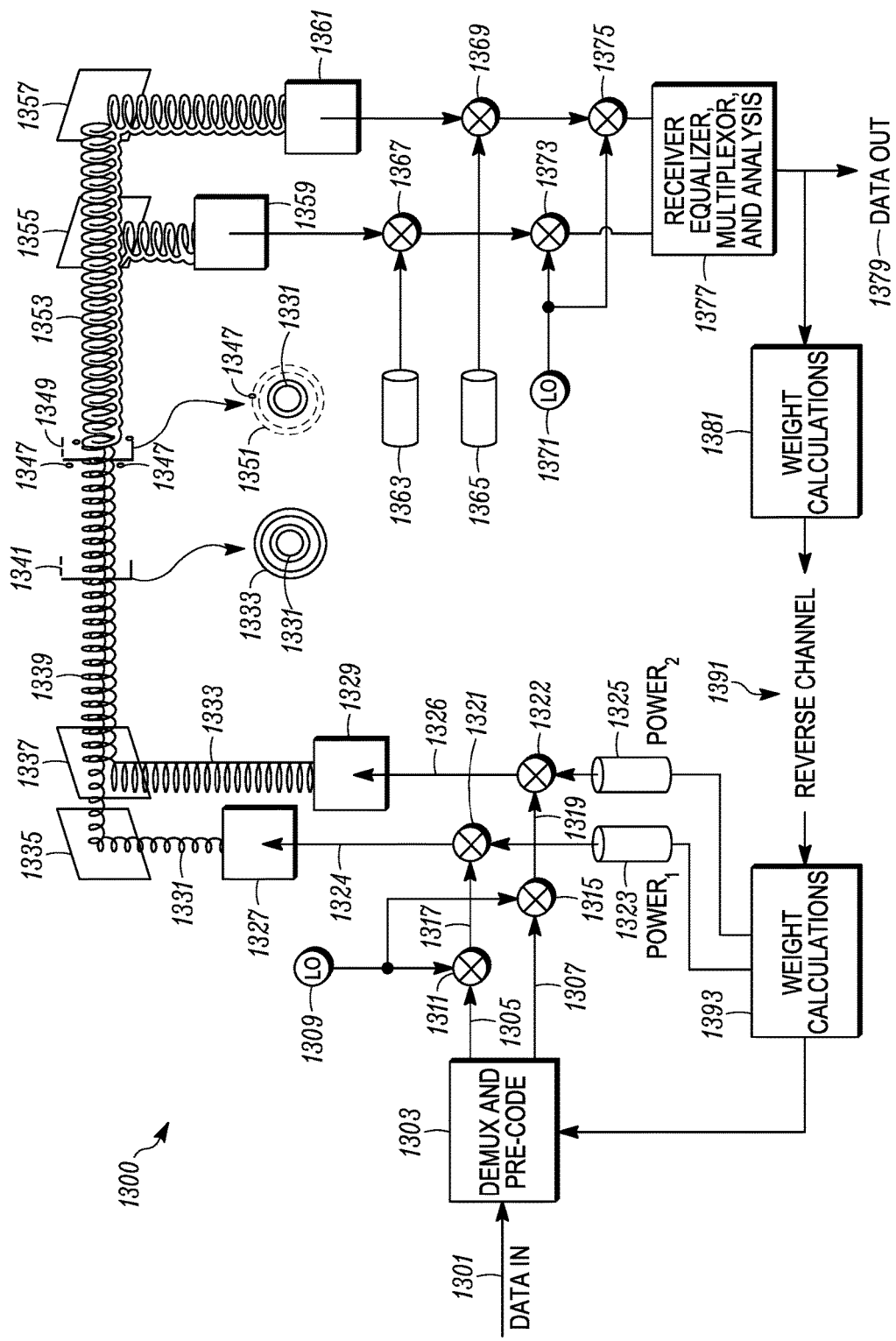
FIG. 13 is a block diagram of an OAM underwater communications system according to an embodiment of the disclosure.

FIG. 13 is a block diagram showing a system for increased data rate transmission in underwater optical communications according to an embodiment of the disclosure. The system 1300 of FIG. 13 mitigates turbidity and/or turbulence utilizing processing methods discussed hereinabove. Input data 1301 is received at demultiplexer and pre-coding module 1303. The demultiplexer and pre-coding module 1303 is in communication with a computer processor which is configured for performing computer operations relating to the coding, transmission, decoding and reception of optical communication signals. The computer processor may be in communication with a memory upon which are stored computer executable instructions. The instructions, when executed by the processor perform steps associated with the encoding, transmission, decoding and reception of optical communication signals. The steps may be specifically performed for optical communications conducted underwater. For example, in undersea communications, the optical communication signals are transmitted through a water medium. The input data 1301 is split into multiple streams 1305, 1307 and pre-coded. Pre-coding may include processing for bit loading, channel power allocation (e.g., through a water-filling algorithm) and defining OFDM sub-carriers. FIG. 13 shows only two data streams 1305, 1307 for simplicity, but more data streams may be defined from the input data 1301. The data streams are mixed with a sinusoidal signal from local oscillator 1309 in mixers 1311, 1315 to create modulated RF signals 1317, 1319.

The modulated RF signals 1317, 1319 are then used to modulate optical signals generated by coherent sources such as lasers 1323, 1325. Laser 1323 is provided a first power level Power$_1$ to produce a first intensity of modulated Gaussian beam optical signal 1324. Laser 1325 is provided a second power level Power$_2$ to produce a second intensity of modulated Gaussian beam optical signal 1326. Power level Power$_1$ may be a different power level than Power$_2$. Each power level is associated with a laser light source that, in turn, is associated with a specific OAM mode.

Gaussian beam optical signals 1324, 1326 are reflected via a respective filter (e.g., spatial light modulator) 1327, 1329, to output a spiral OAM optical signal 1331, 1333. Filters 1327, 1329 are configured to define different number of 360 degree phase rotations per wavelength of propagation distance in each spiral optical signal corresponding to a specific OAM mode. For example, in the embodiment shown in FIG. 13, filter 1329 produces a spiral optical signal 1333 having a greater number of 360 phase rotations per wavelength of propagation distance than the spiral optical signal 1331 generated by filter 1327. The greater number of 360 phase rotations in signal 1333 causes spiral optical signal 1333 to have a greater cross-sectional diameter than signal 1331. The spiral optical signals 1331, 1333 are multiplexed via beamsplitters 1335, 1337 and combined into multiplexed OAM signal 1339. Because spiral optical signal 1331 has a smaller diameter, it propagates through the medium inside the diameter defined by larger spiral optical signal 1333. When multiplexed as a single OAM signal 1339, each spiral optical signal 1331, 1333 defines an orthogonal OAM mode.

A spiral optical signal defining an OAM mode exhibits null values near its center, with maximum amplitude occurring near the outer edge of the twisting phase wavefront. When observed in a direction opposite the direction of propagation (e.g., head on), the OAM mode signal will appear as an annular ring. Additional orthogonal OAM modes will appear as concentric annular rings when viewed from this perspective. This is shown in cross-section views along lines 1341 and 1349 in FIG. 13. Spiral optical signal 1333 is shown as a first annular ring 1333 which surrounds smaller annular ring 1331 representing spiral optical signal 1331.

As the OAM signal 1339 propagates through an underwater medium, particulate matter 1347 suspended in the water column along the propagation path of OAM signal 1339 produces turbidity. In the embodiment shown in FIG. 13, particulate matter 1347 may block a portion of the OAM mode defined by spiral optical signal 1333. This is depicted in cross-section along line 1349, which shows the head-on perceived view of the OAM signal 1339. In this cross-sectional view, spiral optical signal 1331 is unencumbered, allowing full view of this OAM mode. However, spiral optical signal 1333 is seen as annular ring 1351 having areas of higher and lower intensity as indicated by a dashed line. The presence of turbidity affecting this OAM mode is noted by the receiver and provided as feedback to the transmitter for properly weighting future transmissions. For example, an OAM mode experiencing turbulence or turbidity may have less power allocated to it with waterfilling, or, alternately, the phase of the signal transmitted on this OAM mode may be shifted in an attempt to mitigate the turbidity being experienced.

During propagation, turbulence and turbidity along the propagation path causes varying levels of crosstalk along the transmission path between the OAM modes. Crosstalk creates additional spatial variations between the OAM modes. When the signal is received at the receiver, the OAM modes are substantially mixed in the received OAM signal 1353. However, because the multiplexed OAM signal 1339 includes orthogonal OAM modes, the modes can be separated at the receiver and detected.

The received OAM signal 1353 is demultiplexed by beamsplitters 1355, 1357 and provided to filters 1359, 1361 (e.g., spatial light modulators) having the inverse phase reflection of corresponding transmitter filters 1327, 1329, respectively. Receiver filters 1359, 1361 convert the spiral OAM modes into Gaussian-beam optical signals which are demodulated using lasers 1363, 1365, having the same wavelengths as corresponding lasers 1323, 1325 at the transmitters. The light signal is demodulated in mixers 1367, 1369. The power level provided to lasers 1363 and 1365 in the receiver do not contribute to a higher transmission data rate; therefore, lasers 1363, 1365 may have the same power level. Additionally, the power level may be selected to provide modulation of the received signal at a minimum required power level to meet overall power consumption requirements in the receiver. The demodulated received signals are mixed 1373, 1375 with a sinusoidal signal from local oscillator 1371 and demodulated to baseband. The baseband signals are provided to a receiver equalizer 1377 which removes/reduces the crosstalk between the transmitted OAM signals and multiplexes the output OAM signals to form the output data 1379. The received OAM modes are analyzed for channel performance, and data relating to the channel quality, e.g., CSI, is obtained. Maximization algorithms are run against the CSI to determine proper pre-coding characteristics that will maximize the data rate achievable in view of current channel conditions, e.g., using SVD. The results of the maximizing calculations are used to calculate pre-coding weights 1381. The weighting information is transmitted back to the transmitter via the reverse channel 1391, e.g., using a codeword corresponding to a codebook entry. The weights, or codeword, are received at the transmitter 1393 and used to calculate various transmitter parameters for subsequent data transmissions. For example, a water-filling algorithm optimizes the values of Power$_1$ and Power$_2$ to lasers 1323 and 1325 to produce proper intensity levels from lasers 1323, 1325 based on the input power levels. Weight calculations are also performed to determine bit loading schemes for each OFDM data stream 1305, 1307 which maximize data throughput based on the channel conditions currently being experienced.

The use of optical signals for transmitting communications introduces other issues that must be addressed to increase data rate in optical communications, particularly underwater optical communications. For instance, the initial acquisition of the pointing angle of the transmitter must be identified and the receiver aligned to receive the transmitted signal. The optical beam is very narrow and the location of the receiver may not be known a priori. As a result, a search technique may be required. OAM may be used to aid in acquisition by first using higher order OAM modes (Vs) which utilize a wider beam (spatial distribution), or by using a wide Gaussian beam. This technique can thereby reduce search time. During acquisition, the order of the modes can be successively reduced to determine the pointing angle. Once the transmitter direction has been acquired, lower order OAM modes can be used for data transmission with narrower beams.

Wavelength division multiplexing (WDM) may also be used in conjunction with the system, with WDM utilized in a similar manner as OFDM. Therefore, WDM provides another degree of freedom for consideration during power allocation and bit loading.

Furthermore, in addition to pilot tones discussed above, a pilot beam could be used to measure the channel. For example, a Gaussian pilot beam may be transmitted along with the OAM modes or separately from the OAM modes in order to measure the channel characteristics for each mode, but instead of adjusting the receiver solely to correct for crosstalk, techniques discussed above may be used to achieve better performance based on feedback from the receiver utilizing these measurements. Wavefront correction can also be used alone or in combination with the receiver equalizer matrix to mitigate crosstalk between the OAM modes.

The power allocation among OAM modes can include optimization with a preference to turning off completely one or more OAM modes, which can be useful in further reducing transmitter power.

Crosstalk mitigation using the above techniques can also be applied to reducing the effect of imperfect generation of the OAM signals at transmitter. This can be done jointly with the crosstalk mitigation of the undersea channel.

OAM modes as discussed above include modes with positive and negative l and orthogonal polarization for each. Thus for a given t, there are up to 4 modes available.

The modulation and detection technique for the optical signal can be coherent modulation and coherent detection, or, alternatively, intensity modulation and direct detection.

The preceding description has described one or more preferred embodiment(s). However, the invention is not limited to those embodiments. Those of ordinary skill in the art will recognize other possible variations, including some processes using fewer steps or elements, and other alterations such as using nonlinear processing rather than the linear processing using matrices as described herein above.

Embodiments according to this disclosure include additional benefits. For example, the pre-coding, transmission and reception processes and devices described above may be applied to undersea data stations for high data rate transfers. It is desirable that mobile platforms, such as unmanned undersea vehicles (UUVs), unmanned surface vehicles (USVs), and unmanned airborne vehicles (UAVs), have the ability to rapidly transfer large volumes of data, especially from the vehicle to a data station for further processing and forwarding. This may be facilitated by the use of multiple spatial streams provided by the OAM modulation. Essentially, the data rate increases proportionally to the number of spatial streams, without an increase in the total transmit power. Since the size of the receiver lens increases with the number of spatial streams, the data rate can be increased without additional transmit power simply by increasing the number of OAM modes at the transmitter with a corresponding increase in the receiver size.

Networking functionality may also be achieved according to the increased data rate of the embodiments described herein. To expand on the concept for a single link (which can then be extended to networks of links), consider communication between two users. Each user uses OAM, including lenses and/or spatial light modulators. Spatial light modulators may be used to change the amplitude and phase of each signal transmitted or received. Lenses can be used for fixed arrays followed by adaptive signal processing on receive and/or adaptive transmission. Initially, the transmitter probes the undersea channels by sending pilot tones with a wide beam. The receiving user would then receive some of these pilots and determine the best combination of transmit and receive processing, power allocation among different OFDM subcarriers, and the degree of spatial multiplexing (the number of different signals to be transmitted). The receiving user then transmits this information back to the first user. However, rather than sending all this information back to the first user, in order to reduce the data rate needed, the receiving user transmits an identifier of an entry in a preset codebook. The first user (e.g., transmitter) uses the identifier to look up a code entry from which the transmitter may determine transmit weights, OFDM subcarriers, and spatial multiplexing. The transmitter transmits the communication data using the requested weights, OFDM subcarriers, and spatial multiplexing. The receiving user also estimates the coherence time of the channel based on past measurements and also sends information on the estimated coherence time to the transmitting user so that the transmitting user can send pilot tones before the channel changes significantly for channel estimation by the second user. The same process may be used on the reverse channel (communication from the receiving user to the transmitter). To illustrate the capacity improvement on a single link using this method, consider the capacity equation:

$$C = E_H\left\{\log_2\left[\det\left(I_{n_R} + \frac{P_T}{\sigma^2 n_T}HQH^H\right)\right]\right\} \qquad \text{Equation (4)}$$

where $E_H$ is the expected value over the channels, $I_{n_R}$ is an $n_R \times n_R$ identity matrix, $P_T$ is the transmit power, H is the instantaneous $n_R \times n_T$ channel matrix, $\sigma^2$ is the noise power, the superscript H denotes complex conjugate transpose, Q is a matrix which allocates power to the virtual MIMO channels via the waterfilling algorithm, and $n_R$ and $n_T$ are the number of receive and transmit OAM modes, respectively. These techniques create an adaptive, yet persistent network despite the experienced level of turbidity. The nature of optical transmissions in underwater environments inherently provides protection against jamming. The protection is further enhanced by the continuously changing beam patterns, spatial multiplexing, and links that are used. The system uses distributed assets that can rapidly grow as additional nodes are added. Capacity can be added by the use of additional spatial light modulators/lens providing for higher degrees of spatial diversity. Furthermore, with network MIMO, massive MIMO, and multiuser MIMO, a wide mixture of devices can be utilized, as low data rates can be accommodated with simple lens receiver/transmitters, with higher data rates utilizing multiple spatial channels as well as multiple links to nodes utilizing network MIMO. Furthermore, the use of multiple platforms for reception can decrease the required transmit power for long term off-board assets.

Embodiments of this disclosure provide quantum effects creating anti-eavesdropping capabilities. Quantum entanglement is a physical phenomenon that occurs when groups of photons are generated to interact in ways such that the quantum state of each photon cannot be described independently. Instead, a quantum state is given for the system as a whole. This includes the photons generated for OAM. Specifically, single photons have quantized OAM, and thus these photons can be entangled with OAM. Therefore, quantum communications can be used with the OAM system undersea as well for anti-eavesdropping. The use of quantum entanglement in such schemes as quantum decoding and quantum teleportation allows the transmission of data in a manner such that the presence of an eavesdropper can be determined. That is, the receiver can be assured that only it is receiving the data. In summary, in an exemplary system according to the disclosure, photons used for the OAM modes can be entangled to achieve these advantages.

Pre-distortion denies the transmitted data from reaching an eavesdropper. The pre-coding (pre-distortion) can also include 'known codes' (known to both sender and receiver) so that intentional distortion is included that is unknown to the eavesdropper. This includes changing the pre-distortion crosstalk faster than an eavesdropper could track.

Furthermore, the use of pre-coding results in minimum crosstalk only at the receiver location with the appropriate receiver matrix. An eavesdropper at any other location and/or without knowledge of the appropriate receiver matrix would receive a signal with crosstalk that may be impractical to mitigate.

The exploitation of the near-field provides covert communications. OAM light wave communication is a near-field phenomena, with each spatial stream carrying data by the separate modes that are distinguishable only in the near field, which corresponds to a minimum required receive aperture size for a given transmit aperture size and range. This minimum receive aperture size increases at least linearly with range. Thus, with OAM, beyond a certain range the required size of the receive aperture becomes impractical and an eavesdropper would be unable to distinguish the spatial streams. This can be combined with other techniques to provide covert communications.

Laser communication undersea is inherently lossy, with the extinction of photons an exponential function of distance. Furthermore, the lasers are highly directive and are inherently low probability of intercept (LPI) except in the direction of transmission, which provides an additional degree of covertness.

The use of unused OFDM subcarriers creates obfuscation for eavesdroppers. Should a situation occur where range is not sufficient to provide signal obfuscation, unused subcarriers, (i.e., an OFDM subcarrier or even entire spatial modes that are not carrying the intended data streams) may be transmitted in the direction of a suspected eavesdropper further complicating the adversary's effort required to detect and decode the transmission.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

The invention claimed is:

1. An underwater optical communications system including a transmitter and a receiver; the transmitter is configured to receive input data and to generate a plurality of orbital angular momentum optical signals based on the input data, the transmitter is configured to multiplex the plurality of orbital angular momentum optical signals into a single multiplexed optical signal and the transmitter is configured to transmit the plurality of orbital angular momentum optical signals into a water medium by transmitting the single multiplexed optical signal into the water medium; and the receiver is configured to receive the plurality of orbital angular momentum optical signals and to generate output data from the received plurality of orbital angular momentum optical signals;

wherein the receiver is configured to analyze the received plurality of orbital angular momentum optical signals for channel performance and to generate channel state information based on the channel performance;

an optical feedback channel from the receiver to the transmitter that provides the generated channel state information from the receiver to the transmitter; and the transmitter is configured to adjust a power allocation among a plurality of subsequently generated orbital angular momentum optical signals based on the channel state information received from the receiver;

the transmitter is configured to process additional input data using the channel state information received from the receiver;

the transmitter is configured to produce a plurality of radio frequency (RF) signals based on the additional input data;

the transmitter is configured to modulate the plurality of RF signals onto optical signals produced by lasers corresponding to each RF signal to produce modulated optical signals;

the transmitter configured to convert each modulated optical signal into the subsequently generated orbital angular momentum optical signals;

the transmitter is configured to multiplex each of the subsequently generated orbital angular momentum optical signals into a new single multiplexed orbital angular momentum optical signal;

the transmitter is configured to transmit the new multiplexed orbital angular momentum optical signal into the water medium;

the receiver is configured to receive the new multiplexed orbital angular momentum optical signal;

the receiver is configured to analyze the received new multiplexed orbital angular momentum optical signal for channel performance to identify new channel state information;

the receiver is configure to define a plurality of pre-coding values based on the new channel state information;

the receiver is configured to map the plurality of pre-coding values to an entry in a codebook, the entry identifying the plurality of pre-coding values;

the receiver is configured to transmit the codebook entry to the transmitter;

the transmitter is configured to identify a plurality of pre-coding values from the received codebook entry; and the transmitter is configured to process a next portion of input data for transmission using the pre-coding values.

2. The system of claim 1, wherein the transmitter is configured to perform orthogonal frequency division multiplexing on the input data to split the input data into a plurality of subcarriers.

3. The system of claim 1, wherein the transmitter is configured to separate the input data into multiple data streams that are used to form the plurality of orbital angular momentum optical signals, and the transmitter is configured to precode the multiple data streams based on the channel state information received from the receiver.

4. The system of claim 3, wherein the transmitter is further configured to one or more of: adjust a gain of each of the plurality of orbital angular momentum optical signals; adjust bit loading of the received input data; adjust a phase offset of each of the plurality of orbital angular momentum optical signals; and adjust a phase offset of each of the plurality of orbital angular momentum optical signals.

5. The system of claim 3, wherein the receiver is configured to generate output signals from the received plurality of orbital angular momentum optical signals, and the receiver is configured to adjust a gain of each of the output signals.

6. An underwater optical communications system transmitter, comprising:

a demultiplexer with an input that is configured to receive input data, and the demultiplexer is configured to separate the input data into multiple data streams;

orbital angular momentum optical signal generators connected to the demultiplexer, the orbital angular momentum optical signal generators are configured to generate a plurality of orbital angular momentum optical signals based on the multiple data streams, the orbital angular momentum optical signal generators including at least first and second lasers;

an optical feedback channel input that is connected to the demultiplexer and to the first and second lasers, the optical feedback channel input is configured to receive channel state information from a receiver and to adjust power provided to the first and second lasers based on the channel state information; and a multiplexer connected to the orbital angular momentum optical signal generators, the multiplexer is configured to receive the plurality of orbital angular momentum optical signals and to generate a multiplexed orbital angular momentum optical signal that is transmitted into a water medium.

7. The underwater optical communications system transmitter of claim 6, wherein the demultiplexer is configured to perform orthogonal frequency division multiplexing on the input data to split the input data into a plurality of subcarriers.

8. The underwater optical communications system transmitter of claim 6, wherein the demultiplexer is configured to precode the multiple data streams based on the channel state information.

9. An underwater optical communications system receiver, comprising:

a demultiplexer that is configured to receive a multiplexed orbital angular momentum optical signal transmitted through a water medium and that is configured to demultiplex the multiplexed orbital angular momentum optical signal into a plurality of orbital angular momentum optical signals;

a plurality of filters connected to the demultiplexer and configured to receive the plurality of orbital angular momentum optical signals therefrom, the plurality of filters are configured to convert the plurality of orbital angular momentum optical signals into Gaussian-beam optical signals;

a multiplexer connected to the filters and configured to generate a multiplexed output data stream based on the Gaussian-beam optical signals, and configured to analyze the Gaussian-beam optical signals and generate channel state information based on the Gaussian-beam optical signals, the channel state information is suitable to adjust a power allocation among a plurality of subsequently generated orbital angular momentum optical signals transmitted by a transmitter; and an optical feedback channel from the receiver to the transmitter, the optical feedback channel is configured to provide the channel state information from the receiver to the transmitter.

10. The underwater optical communications system receiver of claim 9, wherein the multiplexer includes an equalizer that reduces crosstalk between the plurality of orbital angular momentum optical signals, and multiplexes the Gaussian-beam optical signals to form the multiplexed output data stream.

11. A method of underwater optical communications using a transmitter and a receiver, comprising:

the transmitter receiving input data and generating a plurality of orbital angular momentum optical signals based on the input data;

the transmitter multiplexes the plurality of orbital angular momentum optical signals into a single multiplexed optical signal;

the transmitter transmitting the plurality of orbital angular momentum optical signals into a water medium by transmitting the single multiplexed optical signal into the water medium;

the receiver receiving the plurality of transmitted orbital angular momentum optical signals transmitted through the water medium;

the receiver generating output data from the received plurality of orbital angular momentum optical signals;

the receiver analyzing the received plurality of orbital angular momentum optical signals for channel performance and generating channel state information based on the channel performance;

the receiver transmitting the channel state information to the transmitter through the water medium;

the transmitter receiving the channel state information and adjusting a power allocation among a plurality of subsequently generated orbital angular momentum optical signals based on the channel state information received from the receiver;

processing in the transmitter additional input data using the channel state information received from the receiver;

producing at the transmitter a plurality of radio frequency (RF) signals based on the additional input data;

modulating the plurality of RF signals onto optical signals produced by lasers corresponding to each RF signal to produce modulated optical signals;

converting each modulated optical signal into the subsequently generated orbital angular momentum optical signals;

multiplexing each of the subsequently generated orbital angular momentum optical signals into a new single multiplexed orbital angular momentum optical signal; and transmitting the new multiplexed orbital angular momentum optical signal into the water medium;

receiving the new multiplexed orbital angular momentum optical signal at the receiver;

analyzing the received new multiplexed orbital angular momentum optical signal for channel performance to identify new channel state information;

defining a plurality of pre-coding values based on the new channel state information;

mapping the plurality of pre-coding values to an entry in a codebook, the entry identifying the plurality of pre-coding values;

transmitting the codebook entry from the receiver to the transmitter;

at the transmitter, identifying a plurality of pre-coding values from the received codebook entry; and at the transmitter, processing a next portion of input data for transmission using the pre-coding values.

12. The method of claim 11, further comprising the transmitter performing orthogonal frequency division multiplexing based on the input data to split the input data into a plurality of sub carriers.

13. The method of claim 11, wherein the plurality of pre-coding values includes a bit loading scheme for each of the plurality of RF signals.

14. The method of claim 11, wherein the plurality of pre-coding values includes a value of orthogonal frequency division multiplexing sub-carrier spacing for each of the plurality of RF signals.

15. A method of underwater optical communications using a transmitter and a receiver, comprising:

the transmitter receiving input data and generating a plurality of orbital angular momentum optical signals based on the input data;

processing in the transmitter the input data using a channel state information parameter;

producing at the transmitter a plurality of radio frequency (RF) signals based on the input data;

modulating each of the RF signals onto an optical signal produced by a laser corresponding to each RF signal to produce a plurality of modulated optical signals;

converting each modulated optical signal to a respective one of the orbital angular momentum optical signals;

the transmitter multiplexes the plurality of orbital angular momentum optical signals into a single multiplexed orbital angular momentum optical signal and transmits the plurality of orbital angular momentum optical signals into a water medium by transmitting the single multiplexed orbital angular momentum optical signal into the water medium;

the receiver receiving the single multiplexed orbital angular momentum optical signal transmitted through the water medium;

the receiver generating output data from the received single multiplexed orbital angular momentum optical signal;

analyzing the received single multiplexed orbital angular momentum optical signal for channel performance to identify channel state information;

defining a plurality of pre-coding values based on the channel state information;

mapping the plurality of pre-coding values to an entry in a codebook, the entry identifying the plurality of pre-coding values;

transmitting the codebook entry from the receiver to the transmitter;

at the transmitter, identifying a plurality of pre-coding values from the received codebook entry; and at the transmitter, processing a next portion of input data for transmission using the pre-coding values;

wherein the plurality of pre-coding values includes a power allocation for each of a plurality of subsequent orbital angular momentum optical signals in a new multiplexed orbital angular momentum optical signal to be transmitted by the transmitter to the receiver through the water medium.

16. The method of claim 15, wherein the plurality of pre-coding values includes a phase adjustment for at least one of the subsequent orbital angular momentum optical signals in the new multiplexed orbital angular momentum optical signal, the phase adjustment mitigating the effects of turbidity in the water medium affecting at least one of the subsequent orbital angular momentum optical signals.

17. The method of claim 15, further comprising:

at the receiver, analyzing the channel state information and performing a maximizing function to determine optimal pre-coding values for each of the subsequent orbital angular momentum optical signal based on the channel state information.

* * * * *